US006459554B1

(12) United States Patent
Meiners et al.

(10) Patent No.: US 6,459,554 B1
(45) Date of Patent: Oct. 1, 2002

(54) DRIVE CIRCUIT FOR THE TRIP ACTUATOR OF A NETWORK PROTECTOR AND A NETWORK PROTECTOR INCORPORATING THE SAME

(75) Inventors: Steven Edward Meiners, Beaver Falls; Richard Arthur Johnson, Hopewell Township, both of PA (US)

(73) Assignee: Eaton Corproation, Cleveland, OH (US)

( * ) Notice: Subject to any disclaimer, the term of this patent is extended or adjusted under 35 U.S.C. 154(b) by 169 days.

(21) Appl. No.: 09/654,804

(22) Filed: Sep. 5, 2000

(51) Int. Cl.[7] ................................................ H02H 3/00

(52) U.S. Cl. .......................... 361/63; 361/93.9; 361/78; 327/306

(58) Field of Search .......................... 361/78, 87, 93.1, 361/93.9, 98, 88, 110, 93.3, 59, 60, 62.63; 340/511, 664; 327/306, 309, 310

(56) References Cited

U.S. PATENT DOCUMENTS 3,947,728 A 3/1976 Smith
4,638,175 A * 1/1987 Bradford et al. .............. 307/64
5,367,424 A * 11/1994 Even .......................... 361/18
5,822,165 A 10/1998 Moran
5,936,817 A * 8/1999 Matsko et al. ................ 361/72
6,072,136 A 6/2000 Wehrli, III et al.

* cited by examiner

*Primary Examiner*—Kim Huynh
(74) *Attorney, Agent, or Firm*—Martin J. Moran

(57) ABSTRACT

A network protector includes a coil drive circuit for the trip actuator which operates as a current limiter to protect a trip coil with limited impedance at the upper limit of network voltage while assuring operation at network voltages of less than 10% rated voltage. A comparator provides gate drive current to a FET connected in series with the trip coil as long as coil current is below a reference voltage proportional to a specified maximum value of coil current. When the specified value of coil current is reached, the FET is latched off until the network protector is tripped open again.

8 Claims, 2 Drawing Sheets

DRIVE CIRCUIT FOR THE TRIP ACTUATOR OF A NETWORK PROTECTOR AND A NETWORK PROTECTOR INCORPORATING THE SAME

BACKGROUND OF THE INVENTION

1. Field of the Invention

This invention relates to apparatus for protecting electric power distribution networks, and more particularly, to a network protector with a drive circuit for controlling a trip actuator powered by network voltage which can vary over a wide range.

2. Background Information

Electric power distribution networks which supply power to a specified area such as, for example, a section of the city, an industrial complex or a large building, are fed at multiple points through feeders which each include a network protector. A network protector is a circuit breaker adapted to trip and open the feeder upon detection of reverse power flow, that is, power flowing through the feeder out of the network rather than into the network. Typically, overcurrent protection is provided by other devices such as fuses in series with the network protector.

The network protector is energized by the voltage on the network at the point of connection of the network protector. Standards require that the network protector be able to trip at network voltages as low as 7% of rated voltage. Conventional network protectors have been able to accommodate sufficiently large trip actuator coils having an impedance capable of limiting coil current at the high end of the voltage range while still being able to operate at the low end. A new design of network protector utilizes a circuit breaker which is very compact, and accordingly, has trip coils which are smaller. The problem is exacerbated by the requirements of some users that the network protector be able to operate at higher than rated voltage, by as much as 50%. This extended range of operation, when combined with the smaller physical size of newer trip coils presents a formidable challenge to providing a trip actuator having sufficient impedance to limit coil current at the high voltages while still being able to operate at the low limit of network voltage. It must also be taken into consideration that network protectors are called upon to trip quite frequently and therefore must have significant cycle life.

There is a need, therefore, for an improved network protector and trip actuator therefor which can operate over the full range of required trip voltages without burning out the coil.

SUMMARY OF THE INVENTION

This object and others are satisfied by the invention which is directed to a network protector having separable contacts and an operating mechanism opening the separable contacts when actuated. The operating mechanism is actuated by energization of a trip actuator coil. A control relay generates a trip signal in response to detection of power flow out of the network. A coil drive circuit responsive to the trip signal and powered by the voltage in the protected network energizes the coil. This coil drive circuit incorporates a current limiter limiting energizing current to the coil to a specified value regardless of the wide variation in voltage in the protected network.

The coil drive circuit includes an electronic switch connected in series with the coil and a control circuit which turns the switch on when the coil current is less than the specified value and turns the electronic switch off when the coil current exceeds the specified value. The control circuit includes a current detector generating a current detector signal proportional to the coil current, a reference signal generator generating a reference signal proportional to the specified coil current and a comparator which compares the detector signal to the reference signal. The electronic switch is turned on when the current detector signal is less than the reference signal and is turned off when the current detector signal becomes greater than the reference signal.

The control circuit further includes a latch latching the comparator to turn the electronic switch off once the current becomes greater than the reference signal.

The coil drive circuit can include a voltage generator which generates a coil supply voltage proportional to the voltage in the network. This coil supply voltage is applied across the coil and the electronic switch. The control relay includes trip contacts which connect this voltage generator to the network to energize the coil upon detection of the reverse power flow condition. The reference signal is generated from the output of the voltage generator as a constant value signal proportional to the selected coil current.

The invention also embraces a drive circuit for a trip actuator coil in a network protector providing protection to an electric power distribution network over a wide range of network voltages. This drive circuit comprises a voltage source selectively powered by the network and generating a coil supply voltage proportional to the network voltage when powered. An electronic switch is connected in series with the trip actuator coil and the voltage source so that the coil supply voltage is applied across the trip actuator coil with the electronic switch turned on. The drive circuit further includes a control circuit energized by the voltage source which turns the electronic switch on when energized by the voltage source and turns the electronic switch off when current through the trip actuator coil exceeds a specified value. The control circuit includes a current detector generating a current detector signal proportional to the coil current and a reference signal generator generating a reference signal proportional to the specified value of coil current. A comparator compares the current detector signal to the reference signal and turns the electronic switch on as long as the current detector signal is smaller than the reference signal. When the current detector signal becomes greater than the reference signal, the electronic switch is turned off.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
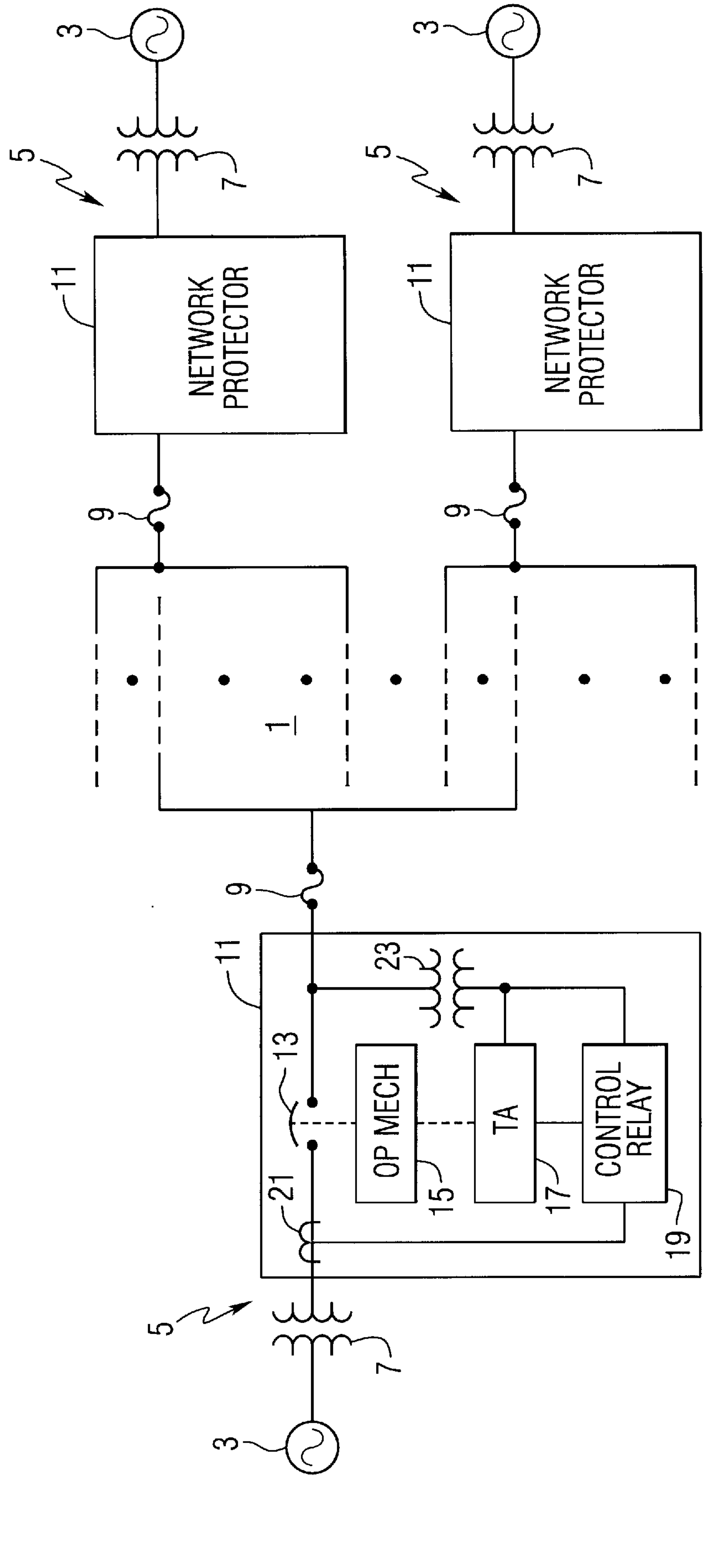
FIG. 1 is a schematic diagram of an electric power distribution network protected by network protectors incorporating the invention.

Referring to FIG. 1, an electric power distribution network 1 is fed by a number of sources 3 through feeders 5. Each of the feeders 5 has a transformer 7, a fuse 9, and a network protector 11. The fuses 9 provide overcurrent protection while the network protectors 11 provide protection against reverse flow of power from the network 1 toward the sources 3. The electric power distribution network 1 is a three phase system and hence the components described to this point are also three phase, although shown in single line form for clarity.

The network protectors 11 include separable contacts 13 which are automatically opened by an operating mechanism 15. The operating mechanism 15 is actuated by a trip actuator assembly 17 in response to a trip signal from a control relay 19. The control relay 19 monitors the current in the feeder 5 through current transformer 21. A voltage proportional to the network voltage is provided to the control relay 19 and to the trip actuator assembly 17 through a potential transformer 23.

As mentioned, newer circuit breakers used for the network protectors 11 are smaller and more compact. An example of such a circuit breaker is provided in U.S. Pat. No. 6,072,136. As also discussed, the physically smaller trip actuators 17 in such circuit breakers have made it difficult to meet the requirements for the wide range of network voltages at which the network protector must operate. In view of the difficulty in providing a physically small trip coil with sufficient impedance to operate at the high end of network voltages at which the network protector must operate, the invention solves the problem by limiting the current which can flow through the trip coil. This limiting of coil current is effected by the coil drive circuit 25 which forms part of the trip actuator assembly 17 shown in FIG. 2 and energizes the trip coil 27. The impedance of the trip coil 27 is increased over the prior art coils by using an increased number of turns of smaller gauge wire for the coil. However, this is not sufficient to prevent burnout of the coil with operation at the higher voltages, hence the need for current limiting by the coil drive circuit.

The coil drive circuit 25 is energized by the network voltage through the transformer 23 and trip contacts 29 of the control relay. When the separable contacts 13 open, auxiliary contacts 31 on the circuit breaker open to de-energize the coil drive circuit 25. A voltage generator 33 includes a full wave rectifier bridge 35 protected by a varistor 37. The rectifier 35 produces a pulsed dc coil supply voltage which is proportional to the network voltage. This coil supply voltage is applied across the trip coil 27 by an electronic switch such as the FET 39 connected in series with the coil. The coil supply voltage is also applied to a voltage regulator 41 which includes a capacitor 43 charged to the peak value of the pulsed dc current through the diode 45. A resistor 47 limits the charging current to the capacitor 43. A zener diode 49 provides a regulated voltage of about 8 volts. Current to the zener is limited by the resistor 51. A capacitor 53 provides smoothing of the regulated voltage. This regulated voltage is used by a control circuit 55 which controls operation of the electronic switch 39. The control circuit includes a pair of dual op amps 57 and 59 which are powered by the regulated voltage applied to pins 4 and 8. The regulated voltage is also applied to a reference signal generator 61 formed by the resistors 63 and 65 connected as a voltage divider across the zener diode 49. The reference signal is applied to the inverting input of the op amp 57 and the non-inverting input of the op amp 59. The control circuit 55 and electronic switch 39 together form a current limiter which limits current through the coil 27 to a specified value established by the reference signal generator 61 formed by the resistors 63 and 65.

The control circuit 55 also includes a current detector 67 which provides a measure of the coil current. This current detector includes a pair of parallel connected resistors 69 in series with the electronic switch 39 and trip coil 27. When voltage is first applied to the circuit, the voltage developed across this resistor combination by coil current is applied through resistors 71 and 73 to the non-inverting input of op amp 57 which operates as a comparator to compare the detector current represented by the voltage across the resistor 69 to the reference signal generated by the reference signal generator 61. With the detector current signal smaller than the reference signal, the output of op amp 57 is low and the output of op amp 59 is high to turn on the electronic switch 39. However, when the coil current increases and the detector current signal exceeds the reference signal, the output of op amp 57 goes high and is latched in this state by feedback through the resistor 73. Thus, the op amp 57 is latched which in turn latches the output of op amp 59 to the low state once the coil current has exceeded the specified value represented by the reference signal. A capacitor 75 assures that upon initial energization of the coil drive circuit the output of op amp 57 is low and the output of op amp 59 is high to turn the electronic switch 39 on and the op amp 57 is turned off. A capacitor 76 connected between the feedback loop of the op amp 57 and ground assures that the circuit does not trip on noise.

Figure 2:
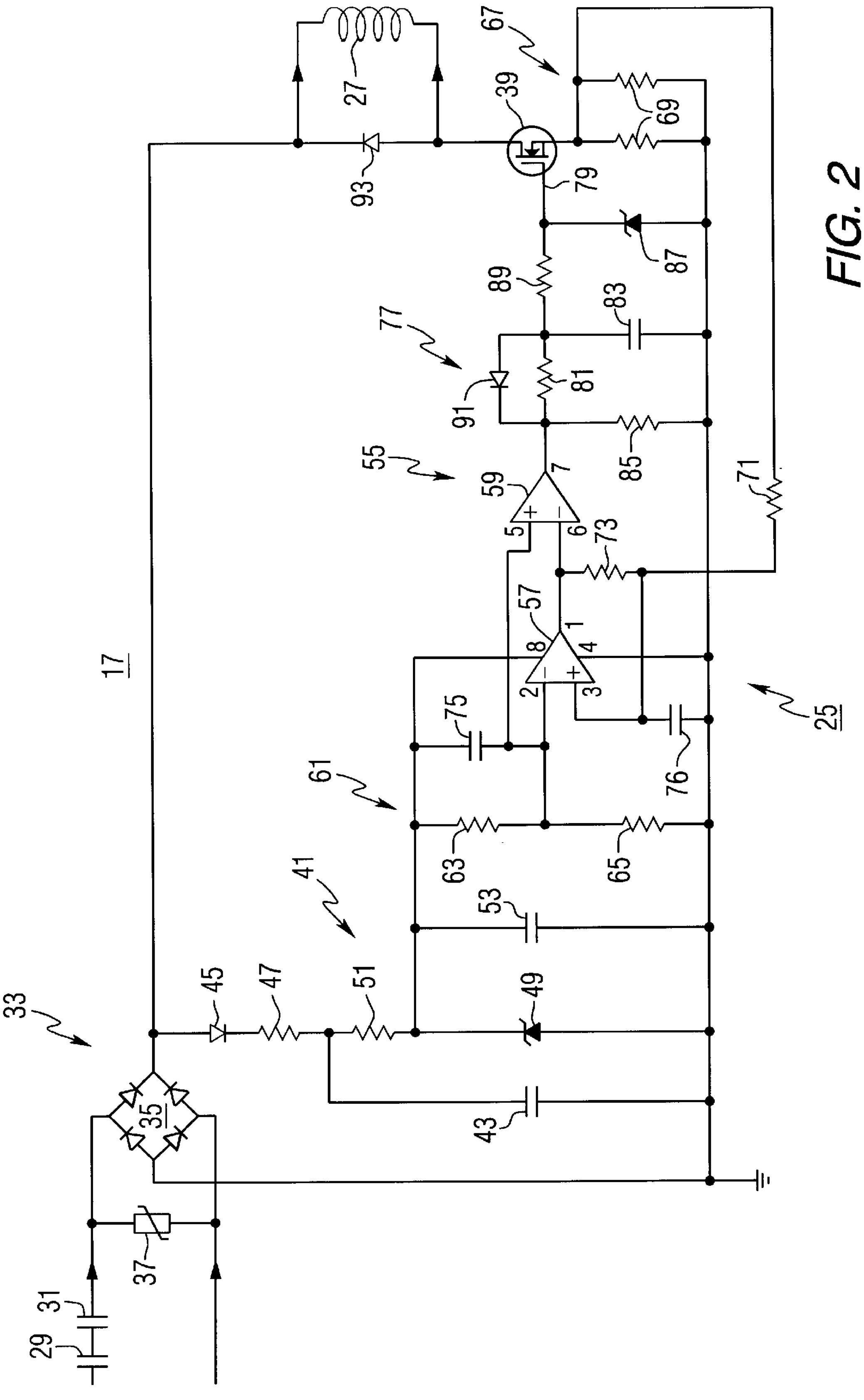
FIG. 2 is a schematic circuit diagram of a trip actuator coil and coil drive circuit which form part of the network protector.

In the preferred embodiment of the coil drive circuit 25, shown in FIG. 2, a delay circuit 77 is provided between the output of the op amp 59 and the gate electrode of the FET 39. The delay circuit 77 is formed by the series resistor 81 and shunt capacitor 83, the values of which are selected so that gate drive voltage for the FET 39 is delayed (approximately 2 milliseconds) to assure that coil current does not flow before the reference signal generator 61 voltage is established. The resistor 85 provides a dummy load for the op amp 59 output on initial power up while the zener diode 87 protects the input gate of the FET 39 from possible overvoltage conditions generated with high voltage transients on the drain of the FET 39, and the resistor 89 limits current to the gate of FET 39. The diode 91 is used to rapidly discharge capacitor 83 and thus, turn off the FET 39 when the output of op amp 59 goes low.

The operation of the trip actuator assembly 17 of FIG. 2 is as follows. Under normal operation of the network protector, the separable contacts 13 are closed so that the auxiliary contacts 31 are closed. However, the trip contacts 29 are open so that the coil drive circuit 25 is de-energized. If the control relay 19 (see FIG. 1) detects reverse current flow in the associated feeder 5, the trip contacts 29 close to provide a voltage to the coil drive circuit 25 which is proportional to the voltage in the protected network. This ac voltage is full wave rectified by the bridge 35 and rapidly charges the capacitor 43 of the voltage regulator 41 to the peak value of this voltage. The dc supply voltage set by the zener diode 49 is rapidly applied through the capacitor 75 to the inverting input of the op amp 57 and the non-inverting input of the op amp 59 to assure that the latch is off and that the output of the op amp 59 is high. As the supply voltage stabilizes, the reference signal generator 61 applies the reference signal proportional to the selected maximum coil current to both the op amp 57 and the op amp 59. As of this point, the FET 39 is off, the output of the current detector 67 is zero, and therefore, the output of the comparator 59 goes high. This gate drive signal is delayed by the delay circuit 77 before being applied to the gate 79 to turn on the FET 39. This applies the coil supply voltage generated by the bridge circuit 35 to the trip coil 27. The coil current which is initially low, flows through the resistors 69 of the current detector 67 to generate a current detector signal which is applied to the op amp 57. As long as the coil current remains below the specified current, the FET 39 remains turn on. In the exemplary coil drive circuit 25, the specified current is about 1.2 amps. With the delay imposed by the delay circuit 77, it may require a couple of half cycles for the coil current to build up to 1.2 amps at the lower trip limit for the network voltage. With the voltage at the high end of the range, the 1.2 amps can be reached in less than 2 milliseconds.

When the coil current reaches the specified value, so that the current detector signal exceeds the reference signal, the output of op amp 57 goes high to drive the output of op amp 59 low. The diode 91 allows the capacitor 83 to rapidly discharge so that the FET 39 is turned off. While this reduces the detector current to zero, the op amp 57 latches the output of the op amp 59 in the low state. Thus, the coil drive circuit 25 is latched in the off state. With the FET 39 turned off, current in the coil 27 circulates through the free-wheeling diode 93 to avoid voltage spikes and assure that the network protector is tripped. When the separable contacts of the network protector open, the auxiliary contacts 31 are opened to de-energize the trip actuator assembly 17 and reset the coil drive circuit 25.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A network protector operative over a wide variation in voltage in a protected electric power distribution network fed by a plurality of voltage sources, the network protector comprising:

separable contacts connecting one of the sources to the electric power distribution network;

an operating mechanism automatically opening the separable contacts when actuated;

a coil device actuating the operating mechanism when energized;

a control relay responsive to power flow through the separable contacts and generating a trip signal in response to detection of power flow out of the network through the separable contacts; and a coil drive circuit responsive to the trip signal and powered by the voltage in the protected electric power distribution network to energize the coil, the coil drive circuit comprising a current limiter limiting coil current to a specified value regardless of the wide variation in voltage in the protected electric power distribution network.

2. The network protector of claim 1 wherein the coil drive circuit includes an electronic switch in series with the coil, and a control circuit turning the electronic switch on when current through the coil is below a specified value, and turning the electronic switch off when the current through the coil exceeds the specified value.

3. The network protector of claim 2 wherein the control circuit comprises a current detector generating a current detector signal proportional to the coil current flowing through the coil, a reference signal generator generating a reference signal proportional to the specified value of coil current, and a comparator comparing the detector signal to the reference signal and turning on the electronic switch when the current detector signal is smaller than the reference signal and turning off the electronic switch when the current detector signal becomes greater than the reference signal.

4. The network protector of claim 3 wherein the control circuit further includes a latch latching the comparator to turn the electronic switch off once the current detector signal becomes greater than the reference signal.

5. The network protector of claim 3 wherein the electronic switch comprises a gate controlled switch and the control circuit includes a delay circuit between the comparator and the gate of the gate control switch to delay turn on of the electronic switch.

6. The network protector of claim 3 wherein the coil drive circuit further comprises a voltage generator generating coil supply voltage proportional to the voltage in the electric power distribution network which is applied to the series connected coil and electronic switch, and wherein the control relay includes trip contacts connecting the voltage generator to the protected electric power distribution network in response to the trip signal.

7. The network protector of claim 6 wherein the control circuit further includes a current detector generating a current detector signal proportional to current flowing through the coil, a reference signal generator powered by the voltage generator generating a reference signal proportional to the specified value of coil current, and a comparator comparing the current detector signal to the reference signal and turning off the electronic switch when the current detector signal exceeds the reference signal.

8. The network protector of claim 7 wherein the control circuit further includes a latch latching the comparator to hold the electronic switch off once the current detector signal becomes greater than the reference signal.

* * * * *